US012784347B2

(12) United States Patent
Tseng

(10) Patent No.: US 12,784,347 B2
(45) Date of Patent: Nov. 3, 2026

(54) METHOD FOR SCORING SURROUND VIEW MONITOR, ELECTRONIC DEVICE AND STORAGE MEDIUM

(71) Applicant: HON HAI PRECISION INDUSTRY CO., LTD., New Taipei (TW)

(72) Inventor: Yi-Ming Tseng, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 164 days.

(21) Appl. No.: 18/770,708

(22) Filed: Jul. 12, 2024

(65) Prior Publication Data

US 2025/0252662 A1 Aug. 7, 2025

(30) Foreign Application Priority Data

Feb. 1, 2024 (CN) ......................... 202410146947.7

(51) Int. Cl.
*G06T 17/00* (2006.01)
*G06V 20/56* (2022.01)

(52) U.S. Cl.
CPC .............. *G06T 17/00* (2013.01); *G06V 20/56* (2022.01)

(58) Field of Classification Search
CPC ................................ G06T 17/00; G06V 20/56
See application file for complete search history.

(56) References Cited

U.S. PATENT DOCUMENTS

2010/0156906 A1* 6/2010 Montgomery ........ G06T 15/205 345/427
2019/0164430 A1* 5/2019 Nix ......................... B60R 11/04
2020/0098164 A1* 3/2020 Bruns ................... G06T 15/205
2021/0383122 A1* 12/2021 Jeong ...................... G06F 18/25
2023/0043075 A1* 2/2023 Watanabe .............. H04N 7/183
2024/0355041 A1* 10/2024 Sabo ..................... G06T 15/205

FOREIGN PATENT DOCUMENTS

CN 114327060 4/2022
CN 116229426 6/2023

* cited by examiner

*Primary Examiner* — Yi Yang
(74) *Attorney, Agent, or Firm* — ScienBiziP, P.C.

(57) ABSTRACT

The present application relates to the field of intelligent driving and provides a method for scoring a surround view monitor, an electronic device and a storage medium. The method constructs a virtual environment system including at least one preset scene. A plurality of virtual camera devices corresponding to the surround view monitor in the virtual environment system is constructed. A plurality of simulated images is obtained by sampling the at least one preset scene using the plurality of virtual camera devices. Once a surround view image corresponding to the plurality of simulated images is generated by using the surround view monitor, the surround view monitor is scored in a plurality of dimensions based on the surround view image.

20 Claims, 8 Drawing Sheets

METHOD FOR SCORING SURROUND VIEW MONITOR, ELECTRONIC DEVICE AND STORAGE MEDIUM

FIELD

The present application belongs to a field of intelligent driving, involves a virtual simulation technology, and specifically relates to a method for scoring a surround view monitor, an electronic device and a storage medium.

BACKGROUND

The surround view monitor can help driving users to determine whether there is an obstacle around a vehicle and know a relative orientation and a distance of the obstacle. In related technologies, when evaluating different surround view monitors, it not only consumes a lot of manpower and material resources, but also lower an accuracy of scoring the surround view monitor due to lack of an objective and unified standard for scoring different surround view monitors.

SUMMARY

In view of the above, it is necessary to provide a method for scoring a surround view monitor, an electronic device and a storage medium that can solve the problems of high cost and low scoring accuracy of scoring the surround view monitor.

Embodiments of the present application provide a method for scoring a surround view monitor. The method includes: constructing a virtual environment system comprising at least one preset scene; constructing a plurality of virtual camera devices corresponding to the surround view monitor in the virtual environment system; obtaining a plurality of simulated images by sampling the at least one preset scene using the plurality of virtual camera devices; generating a surround view image corresponding to the plurality of simulated images using the surround view monitor; and scoring the surround view monitor in a plurality of dimensions based on the surround view image.

In one embodiment, the at least one preset scene comprises a first scene and a second scene; the first scene comprises a preset number of plane images each of which has a preset pattern, and the second scene comprises a plurality of virtual obstacles that are three-dimensional.

In one embodiment, the surround view monitor is applied to a vehicle, and the surround view monitor comprises a plurality of camera devices installed in the vehicle and a surround view model.

In one embodiment, constructing the plurality of virtual camera devices corresponding to the surround view monitor in the virtual environment system comprises: constructing a virtual vehicle corresponding to the vehicle in the virtual environment system according to a size of the vehicle; and acquiring system parameters of the surround view monitor, and constructing the plurality of virtual camera devices installed in the virtual vehicle in the virtual environment system based on the system parameters; wherein the system parameters comprise camera parameters of each of the plurality of camera devices in the vehicle, and installation parameters of each camera device relative to the vehicle.

In one embodiment, generating the surround view image corresponding to the plurality of simulated images using the surround view monitor comprises: inputting the plurality of simulated images into the surround view monitor, and generating the surround view image corresponding to the plurality of simulated images using a surround view model in the surround view monitor.

In one embodiment, scoring the surround view monitor in the plurality of dimensions based on the surround view image comprises: scoring a visual range of the surround view monitor, comprising: determining an optimal visual range based on a gyration radius of the vehicle to which the surround view monitor is applied and a size of the vehicle; determining a real visual range of the surround view monitor based on the surround view image; and determining a visual range score of the surround view monitor based on a ratio between the real visual range and the optimal visual range.

In one embodiment, wherein when the preset scene is the first scene, scoring the surround view monitor in the plurality of dimensions based on the surround view image comprises: scoring a degree of plane distortion of the surround view monitor, comprising: determining an image area corresponding to each plane image in the surround view image according to the preset pattern; determining a corner position error according to corner positions of each plane image and corner positions of the corresponding image area; determining a number of image areas each of which having the corner position error, and determining a plane distortion proportion of the surround view monitor based on the determined number and a total number of plane images in the surround view image; and determining a score of the degree of plane distortion of the surround view monitor based on the corner position error corresponding to each of all the plane images and the plane distortion proportion.

In one embodiment, when the preset scene is the second scene, scoring the surround view monitor in the plurality of dimensions based on the surround view image comprises: scoring a safety coefficient of the surround view monitor, comprising: performing an obstacle recognition on the surround view image using a preset obstacle recognition model and obtaining a predicted category of each predicted obstacle in the surround view image; determining a misjudgment score of each predicted obstacle based on a comparison result between the predicted category of each predicted obstacle and an actual category of the virtual obstacle; determining a position weight of each predicted obstacle according to a position range to which a position of each predicted obstacle in the surround view image belongs; determining a risk score of each predicted obstacle based on the misjudgment score and the position weight of each predicted obstacle; determining a safety coefficient score of the surround view monitor based on the risk score of each of all predicted obstacles.

Embodiments of the present application provide a scoring device of the surround view monitor. The scoring device includes: a constructing module for constructing a virtual environment system comprising at least one preset scene; and constructing a plurality of virtual camera devices corresponding to a surround view monitor in the virtual environment system; a sampling module for using the plurality of virtual camera devices to sample the preset scene to obtain a plurality of simulated images; a generating module for utilizing the surround view monitor to generate a surround view image corresponding to the plurality of simulated images; a scoring module for scoring the surround view monitor in a plurality of dimensions based on the surround view image.

An embodiment of the present application provides an electronic device. The electronic device includes: a storage device and at least one processor. The processor is configured to implement the method of scoring the surround view monitor when executing a computer program stored in the storage device.

Embodiments of the present application provide a non-transitory storage medium. A computer program is stored on the non-transitory storage medium. When the computer program is executed by a processor, the method for scoring the surround view monitor is implemented.

In summary, the method for scoring the surround view monitor described in the present application can simulate and score the surround view monitor in the virtual surround view monitor. In addition, based on the surround view images obtained by sampling a plurality of preset scenes, it is possible to objectively score the surround view monitor in a plurality of dimensions corresponding to a plurality of scoring indicators.

DESCRIPTION

Figure 1:
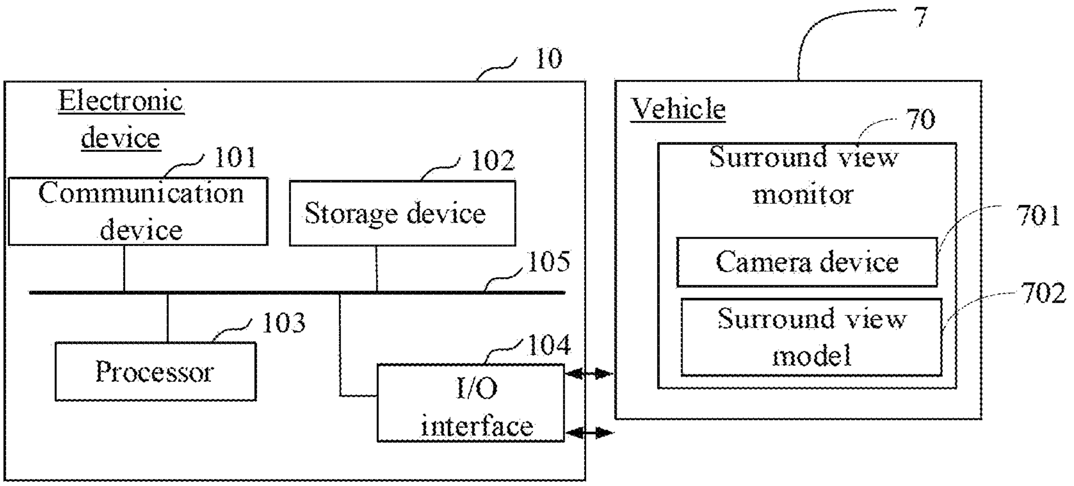
FIG. 1 is a structural diagram of an electronic device provided by an embodiment of the present application.

In order to more clearly understand the above objects, features and advantages of the present application, the present application will be described in detail below with reference to the accompanying drawings and specific embodiments. It should be noted that, as long as there is no conflict, the embodiments of the present application and the features in the embodiments can be combined with each other.

Unless otherwise defined, all technical and scientific terms used herein have the same meaning as commonly understood by one of ordinary skill in the technical field to which the present application belongs. The terminology used herein in the description of the application is for the purpose of describing an example in one embodiment only and is not intended to limit the application.

It should be noted that "at least one" in the present application refers to one or more, and "a plurality of" refers to two or more than two. "And/or" describes the relationship between associated objects, indicating that there can be three relationships. For example, A and/or B can mean: A exists alone, A and B exist simultaneously, and B exists alone, where A, B can be singular or plural. The terms "first", "second", "third", "fourth", etc. (if present) in the description, claims and drawings of the present application are used to distinguish similar objects, rather than to describe a specific order or a sequence.

In the embodiments of the present application, words such as "exemplary" or "for example" are used to represent examples, illustrations or explanations. Any embodiment or design described as "exemplary" or "for example" in the embodiments of the present application is not to be construed as preferred or advantageous over other embodiments or designs. Rather, use of the words "exemplary" or "for example" is intended to present the concept in a concrete manner. The following embodiments and features in the embodiments may be combined with each other without conflict.

In one embodiment, a surround view monitor (SVM) can help driving users check whether there are obstacles around a vehicle and know a relative orientation and a distance of the obstacle. When evaluating different SVM systems in related technologies, not only it consumes a lot of manpower and material resources, and due to a lack of an objective and unified standard for scoring different surround view monitors, an accuracy of scoring the surround view monitor is low.

In order to solve the above problems, embodiments of the present application provide a method for scoring a surround view monitor, by constructing a virtual environment system including at least one preset scene, and constructing a plurality of virtual camera devices corresponding to the surround view monitor in the virtual environment system, using the plurality of virtual camera devices to sample the preset scene to obtain a plurality of simulated images; using a surround view monitor to generate a surround view image corresponding to the plurality of simulated images, and scoring for the surround view monitor based on a plurality of dimensions. The present application can simulate and score the surround view monitor in the virtual surround view monitor, thereby saving costs by using the virtual surround view monitor instead of the real environment to layout. In addition, based on the surround view images obtained by sampling a plurality of preset scenes, it is possible to objectively score the surround view monitor in the plurality of dimensions corresponding to a plurality of scoring indicators.

FIG. 1 is a schematic structural diagram of an electronic device provided by an embodiment of the present application. The embodiment of the present application does not limit a specific type of the electronic device.

As shown in FIG. 1, the electronic device 10 may include a communication device 101, a storage device 102, a processor 103, an input/output (I/O) interface 104 and a bus 105. The processor 103 is coupled to the communication device 101, the storage device 102, and the I/O interface 104 through the bus 105, respectively.

The communication device 101 may include a wired communication device and/or a wireless communication device. The wired communication device can provide one or more of wired communication solutions such as a universal serial bus (USB), a controller area network (CAN), a local interconnect network (LIN), a FlexRay vehicle network standard, etc. The wireless communication device can provide one or more of wireless communication solutions such as a wireless fidelity (Wi-Fi), a Bluetooth (BT), a mobile communication network, a frequency modulation (FM), a near field communication (NFC), an infrared (IR) technology, etc.

The storage device 102 may include one or more random access memories (RAM) and one or more non-volatile memories (NVM). The random access memory can be directly read and written by the processor 103, can be used to store executable programs (such as machine instructions) of an operating system or other running programs, and can also be used to store data of users and applications, etc. The random access memory can include a static random-access memory (SRAM), a dynamic random access memory (DRAM), a synchronous dynamic random access memory (SDRAM), a double data rate synchronous dynamic random access memory (DDR SDRAM), etc.

The non-volatile memory can also store executable programs and data of users and applications, etc., and can be loaded into the random access memory in advance for direct reading and writing by the processor 103. The non-volatile memory can include a disk storage device and a flash memory.

The storage device 102 is used to store one or more computer programs. One or more computer programs are configured for executed by processor 103. The one or more computer programs include a plurality of instructions. When the plurality of instructions is executed by the processor 103, the method for scoring the surround view monitor executed on the electronic device 10 can be implemented.

In other embodiments, the electronic device 10 further includes an interface for connecting an external storage device to expand a storage capacity of the electronic device 10.

The processor 103 may include one or more processing units. For example, the processor 103 may include an application processor (AP), a modem processor, a graphics processing unit (GPU), and an image signal processor (ISP), a controller, a video codec, a digital signal processor (DSP), a baseband processor, and/or a neural network processing unit (NPU), etc. Among them, different processing units can be independent devices or integrated in one or more processors.

The processor 103 provides a computing capability and a control capability. For example, the processor 103 is used to execute a computer program stored in the storage device 102 to implement the method for scoring the surround view monitor.

The I/O interface 104 is used to provide a channel for a user input or a user output. For example, the I/O interface 104 can be used to connect various input and output devices, such as a mouse, a keyboard, a touch device, a display screen, etc., so as to visualize information or enable the user can input information.

The I/O interface 104 can also be used to provide a channel for a data transmission with a vehicle to achieve a data interaction with the surround view monitor of the vehicle. For example, as shown in FIG. 1, a surround view monitor 70 is applied to a vehicle 7. The surround view monitor 70 includes a plurality of camera devices 701 installed in the vehicle 7 and a surround view model 702.

The bus 105 is at least used to provide a channel for a mutual communication between the communication device 101, the storage device 102, the processor 103, and the I/O interface 104 in the electronic device 10.

It can be understood that the structure illustrated in the embodiment of the present application does not constitute a specific limitation on the electronic device 10. In other embodiments of the present application, the electronic device 10 may include more or fewer components than shown in the figure, or some components may be combined, some components may be separated, or some components may be arranged differently. The component illustrated may be implemented in a hardware, a software, or a combination of the software and the hardware.

Figure 2:
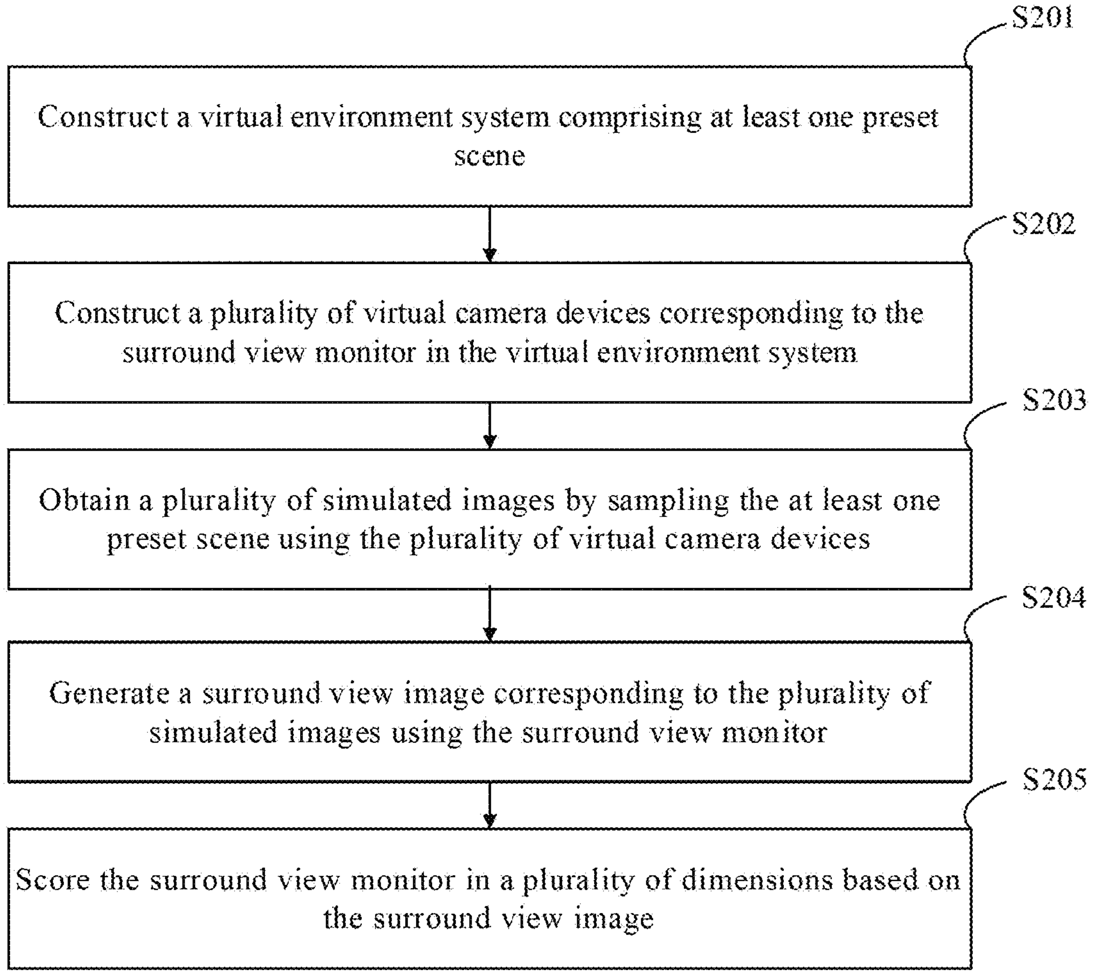
FIG. 2 is a flow chart of a scoring method for a surround view monitor provided by an embodiment of the present application.

FIG. 2 is a flow chart of a method for scoring a surround view monitor provided by an embodiment of the present application. The method for scoring the surround view monitor is applied to an electronic device, such as the electronic device 10 shown in FIG. 1, and specifically includes the following blocks. According to different needs, an order of the blocks in the flow chart can be changed, and some of them can be omitted.

S201, the electronic device constructs a virtual environment system, which includes at least one preset scene.

In one embodiment, in order to score the surround view monitor, the electronic device uses a plurality of camera devices included in the surround view monitor to collect images, and uses a surround view model in the surround view monitor to generate a surround view image based on the collected images. Finally, the electronic device scores the surround view monitor based on the surround view image.

However, when the electronic device collects the images, it is usually necessary for the electronic device to collect a plurality of images of various scenes. If the scenes are directly arranged in a real environment, a cost is high. Therefore, a technology of designing a virtual scene can be used to construct a virtual environment system having a plurality of preset scenes to save costs. Specifically, the technology of designing the virtual scene is a commonly used virtual reality technology that can be used to construct three-dimensional virtual scenes.

In one embodiment, the at least one preset scene includes a first scene and a second scene; among them, the first scene includes a preset number of plane images each of which has a preset pattern, and the second scene includes a plurality of three-dimensional virtual obstacles.

Figure 3:
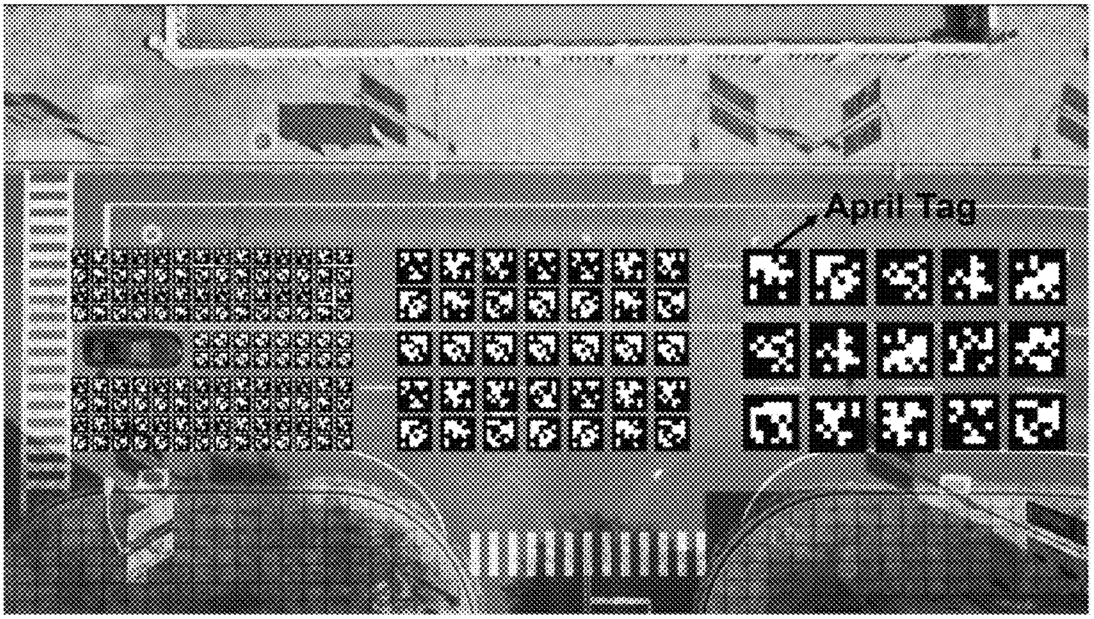
FIG. 3 is an example diagram of a first scenario provided by an embodiment of the present application.

In one embodiment, the plane images may be images with different numbers and different position labels. Sizes of different plane images and preset patterns in different plane images may be different. The number is used to distinguish different plane images, and the position label is used to indicate a position of the plane image. For example, as shown in FIG. 3, the plane image may be a rectangular AprilTag image including colors of black and white, and the position label of the AprilTag image may be position coordinates of four corner points of the AprilTag image.

In one embodiment, the electronic device sets a position weight for each of the plane images, the plane images may have different position weights. For example, the plane image closer to an edge of the first scene has a greater weight, and the plane image closer to an edge corner of the first scene has a greater weight. The greater the weight of the plane image, the reason is that when the surround view model is used to generate the surround view image in a subsequent process, a distortion possibility of an area farther away from the simulated image of a virtual vehicle is higher, and the more it can be used to detect the performance of the surround view model or the performance of the surround view monitor.

Figure 4:
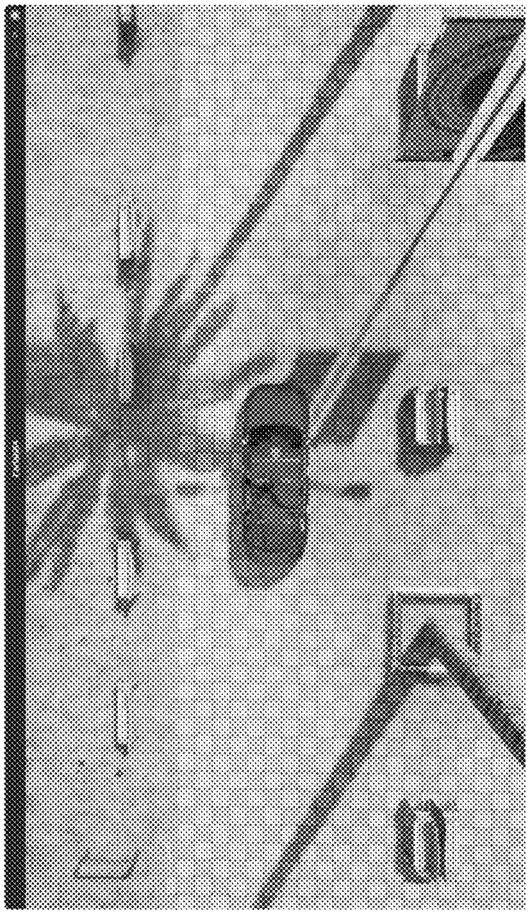
FIG. 4 is an example diagram of a second scenario provided by an embodiment of the present application.

In one embodiment, the virtual obstacles may be virtual obstacles generated based on known categories of objects or subjects, for example, as shown in FIG. 4, the virtual obstacles may be virtual railings, virtual flagpoles, virtual concrete pillars, etc. In order to make the virtual obstacles more closely match actual obstacles, a position, an intensity, an angle, etc. of light sources in the virtual environment system near the virtual obstacles can also be adjusted so that the virtual obstacles have different presentation effects.

In one embodiment, based on the surround view image obtained based on images obtained by sampling the at least one preset scene by the surround view monitor, objective scoring of the surround view monitor in a plurality of dimensions corresponding to a plurality of scoring indicators can be achieved.

Specifically, taking a two-dimensional surround view monitor as an example, the scoring indicators used in scoring the surround view monitor in this embodiment include, but are not limited to:

(a) Visual range: A size of the visual range of the surround view monitor can be determined based on a size of the surround view image generated by the surround view monitor. The greater the visual range, the greater a range of a surrounding environment of the vehicle that the surround view monitor can display to the user, and the higher a score of the surround view monitor; in addition, blind spots of the visual range are also important factors to be considered when evaluating the visual range. When there are blind spots in the visual range, the user will be unable to determine an environment within the blind spots. Correspondingly, the score of the surround view monitor will be greatly reduced;

(b) Degree of plane distortion: the degree of plane distortion indicates a degree of two-dimensional distortion of an object or a subject in the surround view image generated by the surround view monitor. When the degree of plane distortion is greater, it causes the user to be unable to accurately determine the corresponding object or subject according to an image having the greater degree of plane distortion in the surround view image. For example, a user may misjudge a straight ahead indicator arrow as a curved turn indicator arrow based on an image with a large distortion, causing the user to make a wrong turn when driving the vehicle; therefore, the greater the degree of plane distortion in the image, the lower the score of the surround view monitor;

(c) Safety coefficient: The safety coefficient represents a driving safety index when the user is driving based on the surround view image generated by the surround view monitor. A main factor affecting the safety coefficient is a degree of distortion of a three-dimensional obstacle in the surround view image generated by the surround view monitor; if the degree of distortion of the three-dimensional obstacle is greater, it causes the user to misjudge the three-dimensional obstacle as a plane obstacle, resulting in a dangerous situation such as a collision between the vehicle and the three-dimensional obstacle; therefore, the smaller the safety coefficient, the lower the score of the performance of the surround view monitor.

In one embodiment, the visual range and the degree of plane distortion of the surround view monitor can be scored based on the preset number of plane images each of which has the preset pattern in the first scene; and can score the safety coefficient of the surround view monitor based on the second scene the plurality of three-dimensional virtual obstacles in the second scene. For details, please refer to the introduction in subsequent embodiments.

S202, the electronic device constructs a plurality of virtual camera devices corresponding to the surround view monitor in the virtual environment system.

In one embodiment, the surround view monitor needs to be scored; the surround view monitor is applied to a vehicle, and the vehicle represents a real vehicle.

In one embodiment, the surround view monitor includes a plurality of camera devices installed in the vehicle and a surround view model. The plurality of camera devices are real camera devices installed at a plurality of directions in the vehicle. For example, the plurality of camera devices may be four fisheye camera devices respectively installed at orientations of a front, a rear, a left, a right of the vehicle, where each orientation corresponds to one fisheye camera, and the four fisheye camera devices are respectively used to collect images in front of the vehicle, behind the vehicle, on the left of the vehicle, and on the right of the vehicle. The surround view model is used to generate the surround view image based on the images captured by the plurality of camera devices.

In one embodiment, constructing the plurality of virtual camera devices corresponding to the surround view monitor in the virtual environment system includes: constructing a virtual vehicle corresponding to the vehicle in the virtual environment system according to a size of the vehicle; acquiring system parameters of the surround view monitor, and constructing the plurality of virtual camera devices installed in the virtual vehicle in the virtual environment system based on the system parameters; among them, the system parameters include camera parameters of each of the plurality of camera devices in the vehicle, and installation parameters of each camera device relative to the vehicle.

In one embodiment, the size of the vehicle includes a length, a width, and a height of the vehicle. A virtual vehicle with a same ratio of a length to a width, and a same ratio of the length to a height as the vehicle can be generated in the virtual environment system according to the size of the vehicle. The generated virtual vehicle does not necessarily refer to a virtual vehicle with a form of a vehicle, but can also generally refer to a unit that can implement specific functions of a vehicle.

In one embodiment, the camera parameters of each camera device include but are not limited to a focal length, a visual range, an optical axis. The installation parameters of each camera device relative to the vehicle include but are not limited to an installation position, an installation angle. The plurality of virtual camera devices in the virtual vehicle are constructed according to the system parameters of the surround view monitor.

Among them, a number of the virtual camera devices is consistent with a number of real camera devices installed in the vehicle, and the virtual camera devices have a one-to-one correspondence with the real camera devices. The installation parameters of each virtual camera device relative to the virtual vehicle are consistent with the installation parameters of the corresponding real camera device relative to the real vehicle. In addition, the virtual camera device does not necessarily refer to a virtual camera device having a form of a camera device, but may generally refer to a unit that can realize a specific function of the camera device.

In one embodiment, a tool such as a camera renderer can be used to construct the plurality of virtual camera devices corresponding to the surround view monitor in the virtual environment system. Specifically, the virtual environment system can be imported into the camera renderer, and then the system parameters of the surround view monitor can be input into the camera renderer, and then the camera renderer is used to set each virtual camera device on the virtual vehicle in the virtual environment system according to the system parameters.

S203, the electronic device obtains a plurality of simulated images by sampling the at least one preset scene using the plurality of virtual camera devices.

In one embodiment, the virtual vehicle is controlled to drive or move in the preset scene, and the virtual camera device installed in each direction of the virtual vehicle is used to collect images of the preset scene in the corresponding direction to obtain the plurality of simulated images.

For example, the virtual camera devices installed in the four directions of the front, rear, left, and right of the virtual vehicle are respectively used to collect images of the scenes in the front of the vehicle, behind the vehicle, on the left of the vehicle, and on the right of the vehicle to obtain the plurality of simulated images in the four directions.

In one example, refer to FIG. 3, which is an example image of an overlooking perspective when the virtual vehicle uses the virtual camera device to sample the image in the first scene. Refer to FIG. 4, which is an example of an overlooking perspective when the virtual vehicle uses the virtual camera device to sample the image in the second scene.

Figure 5:
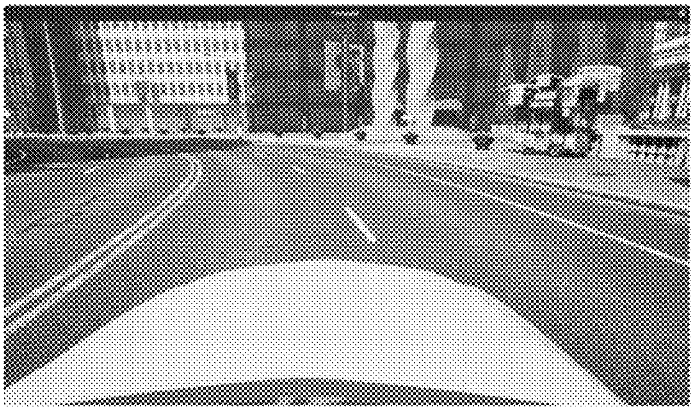
FIG. 5 is an example diagram of a simulated image provided by an embodiment of the present application.

The virtual camera device installed in front of the virtual vehicle is used to sample the scene in front of the virtual vehicle, and the simulated image that is obtained is shown in FIG. 5.

S204, the electronic device generates a surround view image corresponding to the plurality of simulated images using the surround view monitor.

In one embodiment, generating the surround view image corresponding to the plurality of simulated images using the surround view monitor includes: inputting the plurality of simulated images into the surround view monitor, and generating the surround view image corresponding to the plurality of simulated images using the surround view model in the surround view monitor.

In one embodiment, the surround view model can generate the surround view image by stitching the plurality of simulated images in the plurality of directions. Specifically, steps of the surround view model to generate the surround view image include: performing an image correction on each of the plurality of simulated images, the image correction including a camera distortion correction and a camera projection correction, so that the plurality of simulated images has a consistent geometric shape; performing an image registration on the plurality of simulated images to eliminate differences in position and angle of the plurality of simulated images; generating the surround view image by fusing the plurality of simulated images using an image splicing and fusion algorithm after the image registration has been performed.

S205, the electronic device scores the surround view monitor in a plurality of dimensions based on the surround view image.

In one embodiment, the generated surround view image may have some problems because the surround view monitor may have certain defects. For example, defects of an installation position or an angle of the camera device may cause the surround view image to have a smaller visual range and have blind spots; defects in an image correction method used by the surround view model leads to problems such as a plane distortion in the surround view image; defects in an image registration method and defects in an image fusion method used by the surround view model leads to three-dimensional obstacles appear distorted in the surround view image, and can easily be mistaken for flat objects or subjects by the user.

In one embodiment, the above problems affect a presentation effect of the surround view image, so the surround view monitor can be scored in the plurality of dimensions based on the surround view image.

Figure 6:
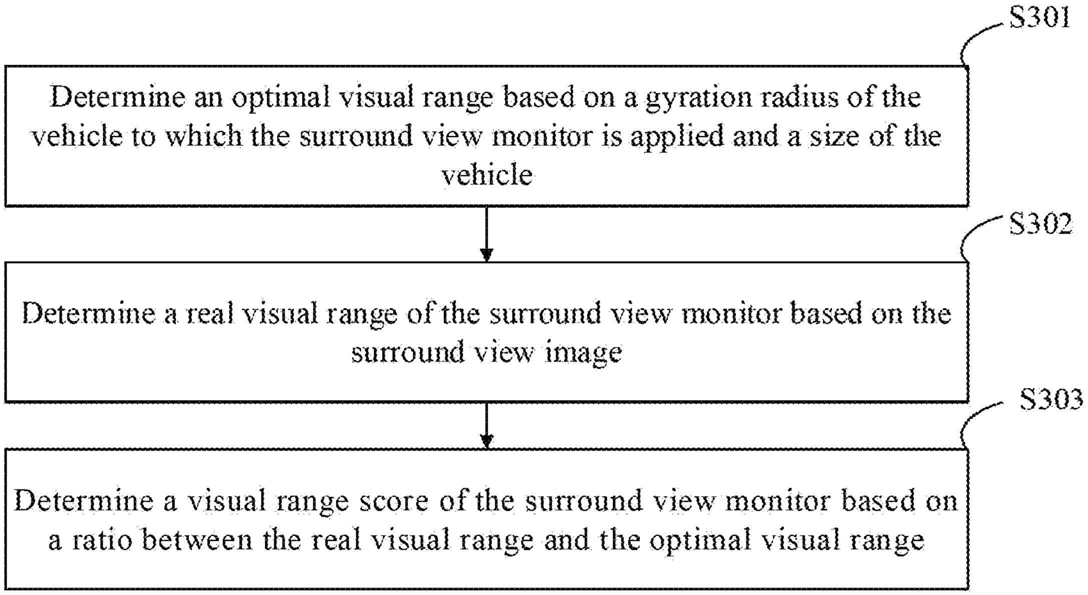
FIG. 6 is a flow chart of a method for scoring a visual range provided by an embodiment of the present application.

In one embodiment, scoring the surround view monitor in the plurality of dimensions based on the surround view image includes: scoring the visual range of the surround view monitor. For example, as shown in FIG. 6, scoring the visual range of the surround view monitor includes the following blocks:

S301, the electronic device determines an optimal visual range based on a gyration radius of the vehicle to which the surround view monitor is applied and a size of the vehicle.

Figure 7:
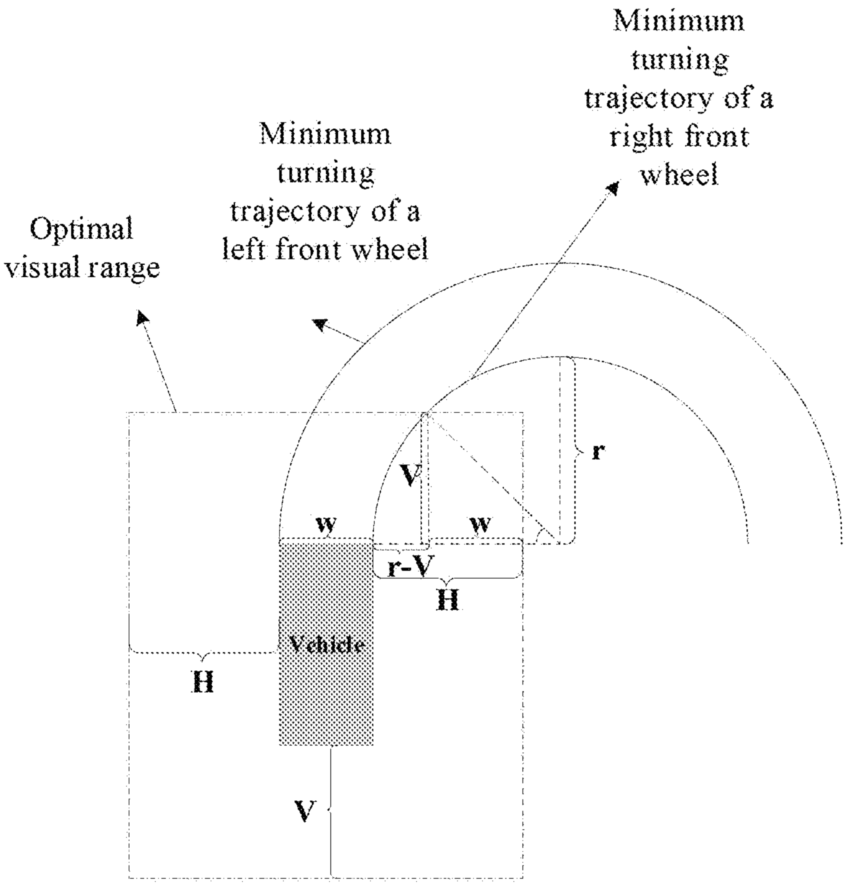
FIG. 7 is an example diagram of an optimal visual range provided by an embodiment of the present application.

In one embodiment, the gyration radius of the vehicle represents a minimum gyration radius of the vehicle when the vehicle turns. For example, as shown in FIG. 7, taking the vehicle turning to the right as an example, two curve traces respectively represent a minimum turning trajectory of a left front wheel and a minimum turning trajectory of a right front wheel of the vehicle. Among them, a radius r of a circle enclosed by the minimum turning trajectory of the right front wheel is the gyration radius of the vehicle. The gyration radius of the vehicle is a known fixed parameter of the vehicle and can be obtained from the vehicle's manufacturer.

In one embodiment, determine the optimal visual range based on the gyration radius and the size of the vehicle includes: determining an optimal visual range V in a vertical direction of the vehicle according to the gyration radius of the vehicle; then determining an optimal visual range H in a horizontal direction based on the gyration radius, the optimal visual range V, and the width of the vehicle.

For example, as shown in FIG. 7, the optimal visual range V can be determined based on a product of the gyration radius and a sine value of a preset angle. For example, the optimal visual range $V=r\times\sin 45°=r/\sqrt{2}$, when r=9 m, the optimal visual range V≈6.36 m; then, a difference between the gyration radius and the optimal visual range V can be determined, and then the optimal visual range H can be determined based on a sum of the difference and the width of the vehicle, for example, let the optimal visual range $H=r-V+w$, where w represents the width of the vehicle. When r=9 m, w=3 m, the optimal visual range H≈5.64 m.

In other embodiments, a width between two front wheels of the vehicle can also be used to replace the width of the vehicle in the above embodiment, and the optimal visual range H is determined using the width between the two front wheels of the vehicle.

In one embodiment, the optimal visual range determined based on the gyration radius and the size of the vehicle is an ideal visual range of the surround view monitor, which can provide a sufficiently wide visual range reference for a driver.

S302, the electronic device determines a real visual range of the surround view monitor based on the surround view image.

In one embodiment, the electronic device determines a first ratio between a length C of the surround view image and a length c of an area of the vehicle in the surround view image, and determines the real visual range v in the horizontal direction of the real visual range of the surround view monitor based on a product of the first ratio and the width w of the vehicle; determines a second ratio between a width K of the surround view image and a width k of the area of the vehicle in the surround view image, and determines a real visual range h in the vertical direction of the real visual range of the surround view monitor based on a product of the second ratio and a length 1 of the vehicle.

Figure 8:
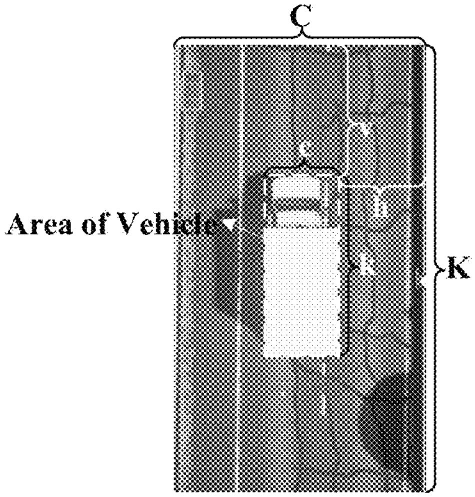
FIG. 8 is an example diagram of a real visual range provided by an embodiment of the present application.

For example, as shown in FIG. 8, the first ratio=C/c, the real visual range v=(w×C/cw)/2; the second ratio=K/k, the real visual range h=(1×K/k−1)/2.

S303, the electronic device determines a visual range score of the surround view monitor based on a ratio between the real visual range and the optimal visual range.

In one embodiment, the ratio between the real visual range and the optimal visual range may include: a ratio between the real visual range v and the optimal visual range V in the vertical direction, and a ratio between the real visual range h and the optimal visual range H in the horizontal direction.

The visual range score includes a score of the optimal visual range in the vertical direction corresponding to the ratio between the real visual range v and the optimal visual range V, and the visual range score in the horizontal direction corresponding to the ratio between the real visual range h to the optimal visual range H.

The larger the real visual range v, the greater the ratio between the real visual range v and the optimal visual range V in the vertical direction, and the higher the score of the optimal visual range in the vertical direction; the larger the real visual range h, the greater the ratio between the real visual range h and the optimal visual range H in the horizontal direction, and the higher the score of the optimal visual range in the horizontal direction.

In one embodiment, the electronic device can determine a first numerical range to which the ratio belongs, and then can determine the score of the first numerical range by searching a first relationship table, the first relationship table includes relationships between first numerical ranges and scores of visual ranges, as shown in Table 1, for example.

TABLE 1

| First numerical range | Score of visual range |
|---|---|
| (0, 0.3] | 1 |
| (0.3, 0.6] | 2 |
| (0.6, 1] | 3 |
| >1 | 4 |

In an example, the optimal visual range V=6.36 m, the optimal visual range H=5.64 m, the real visual range v=6.5 m, the real visual range h=3.8 m; the ratios between the real visual range and the optimal visual range include: v/V=1.02, h/H=0.67; among them, v/V>1, according to Table 1, the visual range score in the vertical direction is 4; h/H belongs to (0.6, 1], according to Table 1, it can be seen that the visual range score in the horizontal direction is 3.

In one embodiment, the visual range score of the surround view monitor may also be determined based on an average of the score of the optimal visual range in the vertical direction and the score of the optimal visual range in the horizontal direction.

Figure 9:
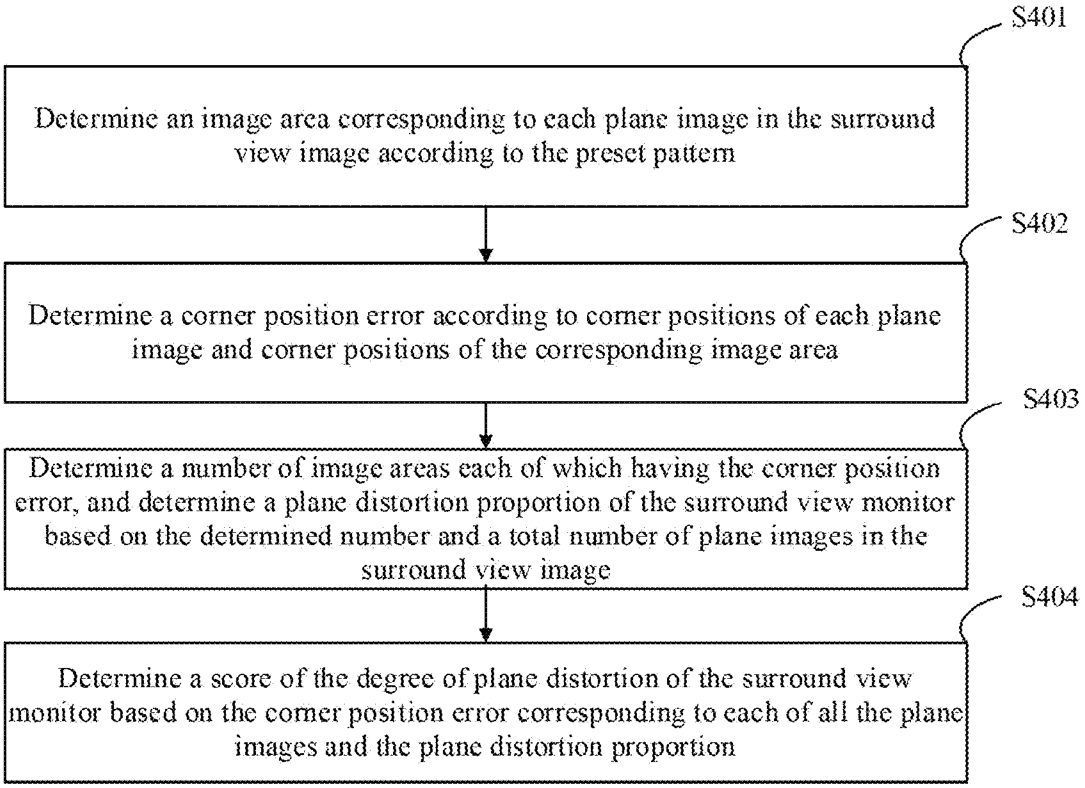
FIG. 9 is a flow chart of a method for scoring a degree of plane distortion provided by an embodiment of the present application.

In one embodiment, when the preset scene is the first scene, scoring the surround view monitor in the plurality of dimensions based on the surround view image includes: scoring a degree of plane distortion of the surround view monitor. As shown in FIG. 9, includes the following blocks:

S401, the electronic device determines an image area corresponding to each plane image in the surround view image according to the preset pattern.

In one embodiment, since the preset pattern in each plane image is a known pattern, an image matching can be performed on the first scene and the surround view image based on an image matching algorithm, thereby the electronic device determines the image area corresponding to each plane image in the surround view image. The image matching algorithm may include but is not limited to a scale-invariant feature conversion algorithm, a block-based matching method, a window-based matching method, a phase correlation-based matching method, and a convolutional neural network-based deep learning algorithm.

S402, the electronic device determines a corner position error according to corner positions of each plane image and corner positions of the corresponding image area.

In one embodiment, methods for determining the corner positions of any plane image include but are not limited to a Harris response function algorithm and a Shi-Tomasi response function algorithm. Thereafter, a rectangular coordinate system can be constructed with a lower left corner position of the surround view image as a coordinate origin, thereby determining coordinates corresponding to corner positions of any image area.

In one embodiment, since each plane image has a corresponding position label, coordinates of the position label of the plane image in an original coordinate system can be converted to standard coordinates of the plane image in the coordinate system corresponding to the surround view image. Such that the corner position error can be determined based on the corner positions of each plane image and the corner positions of the corresponding image area in the coordinate system corresponding to the surround view image. Among them, the corner position error of any plane image can be determined based on the Euclidean distance. A calculation formula includes:

$$\sum_{i=1}^{n}\sqrt{(x_i - x_{c_i})^2 + (y_i - y_{c_i})^2},$$

Among them, $x_i$ represents an abscissa of the i-th corner position of the image area, $y_i$ represents an ordinate of the i-th corner position of the image area, $x_{c_i}$ represents an abscissa of the standard coordinates of the i-th corner position of the plane image, $y_{c_i}$ represents an ordinate of the standard coordinates of the i-th corner position of the plane image, n represents a number of corner positions.

For example, when the plane image is a rectangular image, n=4, a corner position of an upper left corner of the plane image can be set as a first corner position of the plane image in a clockwise direction, and accordingly, a corner position of a lower left corner of the plane image can be set as a fourth corner position of the plane image. Correspondingly, the corner position of the upper left corner of the image area corresponding to the plane image is the first corner position of the image area, and the corner position of the lower left corner of the image area is the fourth corner position of the image area.

Figure 10:
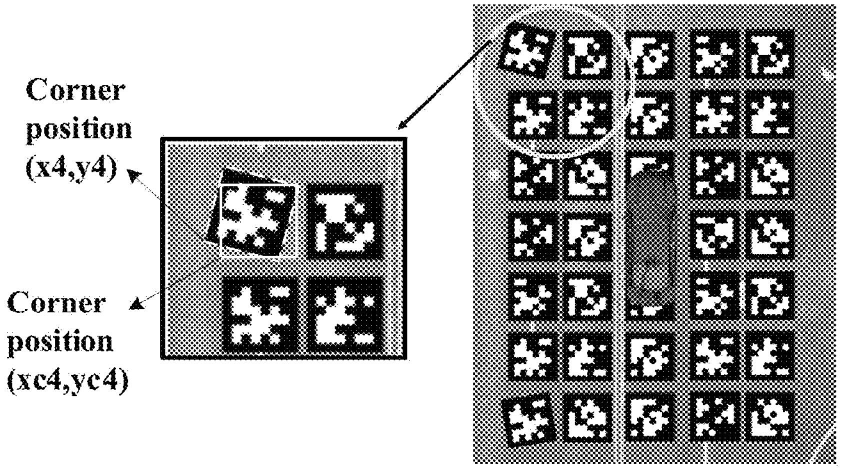
FIG. 10 is an example diagram of a corner position error provided by an embodiment of the present application.

For example, FIG. 10 is an example of a corner position error provided by an embodiment of the present application. Taking the plane image in the upper left corner of the surround view image as an example, a white rectangular solid line frame represents an original position of the plane image in the first scene, among them, a corner position ($x_{c4}$, $y_{c4}$) of a lower left corner of the plane image is as shown in FIG. 10; a white rectangular dashed frame represents the image area corresponding to the plane image in the surround view image, a corner position $(x_4, y_4)$ of a lower left corner of the image area is as shown in FIG. 10. The corner position $(x_{c4}, y_{c4})$ is the fourth corner position of the plane image, and the corner position $(x_4, y_4)$ is the fourth corner position of the image area, and a corner position error between the corner position $(x_{c4}, y_{c4})$ and the corner position $(x_4, y_4)$ is $\sqrt{(x_4-x_{c4})^2+(y_4-y_{c4})^2}$.

S403, the electronic device determines a number of image areas each of which having the corner position error, and determines a plane distortion proportion of the surround view monitor based on the determined number and a total number of plane images in the surround view image.

In one embodiment, the image area having the corner position error can be defined to be an image area of which the corner position error is not to be zero. The number of image areas each of which having the corner position error can be counted, and the plane distortion proportion can be determined based on a ratio between the number of image areas each of which having the corner position error and the total number of plane images in the surround view image. For example, if it is determined that there are two image areas each of which having the corner position error existing between each of two image areas and the corresponding plane image is not zero, then the number of image areas each of which having the corner position error is determined to be 2. If the total number of plane images in the surround view image is 35, then the plane distortion proportion is 2/35≈5.7%.

In other embodiments, a weight of each plane image corresponding to the image area with the corner position error can also be determined, and the plane distortion proportion is determined based on a sum of the weights. For example, if the number of image areas with corner position errors is determined to be 2, the weight of the plane image corresponding to one of the image areas is 2, and the weight of the plane image corresponding to the other image area is 1, then the plane distortion proportion is (2+1)/35≈8.6%.

S404, the electronic device determines a score of the degree of plane distortion of the surround view monitor based on the corner position error corresponding to each of all the plane images and the plane distortion proportion.

In one embodiment, a sum of the corner position error corresponding to each of all the plane images can be determined by the electronic device, and a first score of the degree of plane distortion of the surround view monitor is determined by the electronic device based on the sum, among them, the sum is inversely proportional to the first score of the degree of plane distortion.

A second numerical range to which the sum belongs can be determined, and then the first score of the degree of plane distortion corresponding to the second numerical range can be determined by searching a second relationship table, among them, the second relationship table includes a relationship between the second numerical range and the first score of the degree of plane distortion. Table 2 is shown as an example.

TABLE 2

| Second numerical range (unit: m) | First score of the degree of plane distortion |
|---|---|
| (0, 1] | 4 |
| (1, 2] | 3 |
| (2, 3] | 2 |
| >3 | 1 |

In an example, the sum of the corner position errors corresponding to all plane images is 2.13 m, the second numerical range to which the sum belongs is (2, 3], and the corresponding score of the degree of plane distortion is 2.

In one embodiment, the plane distortion proportion is inversely proportional to the second score of the degree of plane distortion. A third numerical range to which the plane distortion proportion belongs can be determined by the electronic device, and the second score of the degree of plane distortion corresponding the third numerical range can be determined by the electronic device by searching a third relationship table, among them, the third relationship table includes the corresponding relationship between the third numerical range and the second score of the degree of plane distortion, for example, as shown in Table 3.

TABLE 3

| Third numerical range (unit: meter m) | Second score of the degree of plane distortion |
|---|---|
| (0, 5%] | 4 |
| (5%, 10%] | 3 |
| (10%, 15%] | 2 |
| >15% | 1 |

In an example, the plane distortion proportion is 5.7%, the second numerical range that the plane distortion proportion belongs to is (5%, 10%], and the corresponding second score of the degree of plane distortion is 3.

In one embodiment, the score of the degree of plane distortion can be determined by the electronic device based on a sum of the first score and the second score, and the higher the score of the degree of plane distortion, the better the performance of the surround view monitor. In other embodiments, the score of the degree of plane distortion may be determined by the electronic device based on a mean value of the first score and the second score, and the higher the score of the degree of plane distortion, the better the performance of the surround view monitor.

In one embodiment, when it is determined based on the image matching algorithm that the preset pattern that should appear in the surround view image is missing, it means that the surround view monitor has a blind spot in the visual range, and the score of the degree of plane distortion can be set to a lowest score by the electronic device.

Figure 11:
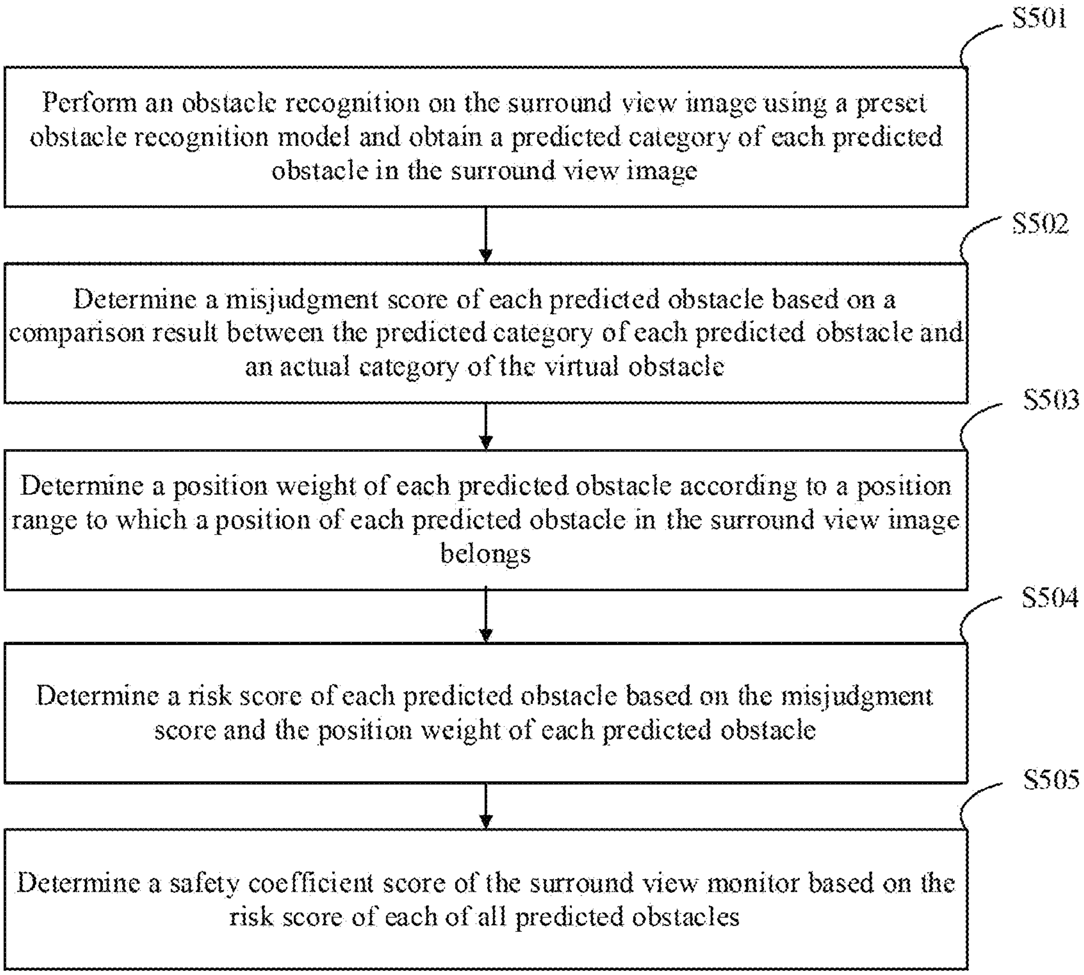
FIG. 11 is a flow chart of a method for scoring a safety coefficient provided by an embodiment of the present application.

In one embodiment, when the preset scene is the second scene, scoring the surround view monitor in the plurality of dimensions based on the surround view image includes: scoring a safety coefficient of the surround view monitor. As shown in FIG. 11, scoring the safety coefficient of the surround view monitor includes the following blocks:

S501, the electronic device performs an obstacle recognition on the surround view image using a preset obstacle recognition model and obtains a predicted category of each predicted obstacle in the surround view image.

In one embodiment, since the surround view image is for reference by the driver of the vehicle, it is up to the driver to determine whether the obstacle in the surround view image is a planar obstacle that does not need to be avoided or a three-dimensional obstacle that needs to be avoided. Therefore, the obstacle recognition model is used to simulate the user determining a category of an obstacle based on the surround view image.

Specifically, labels of image samples in the training data of the obstacle recognition model include whether the user misjudge obstacles, and what type of obstacles the user misjudges as other types of obstacles, among them, categories of obstacles include three categories, and the three categories include a first category of planar obstacles, a second category of inanimate three-dimensional obstacles (such as immovable metal railings), and a third category of animate obstacles (such as movable human bodies).

In one embodiment, the obstacle recognition model may be a deep learning model based on a convolutional neural network. An input of the obstacle recognition model is an image, and an output of the obstacle recognition model is a predicted category of the obstacle in the image.

Figure 12:
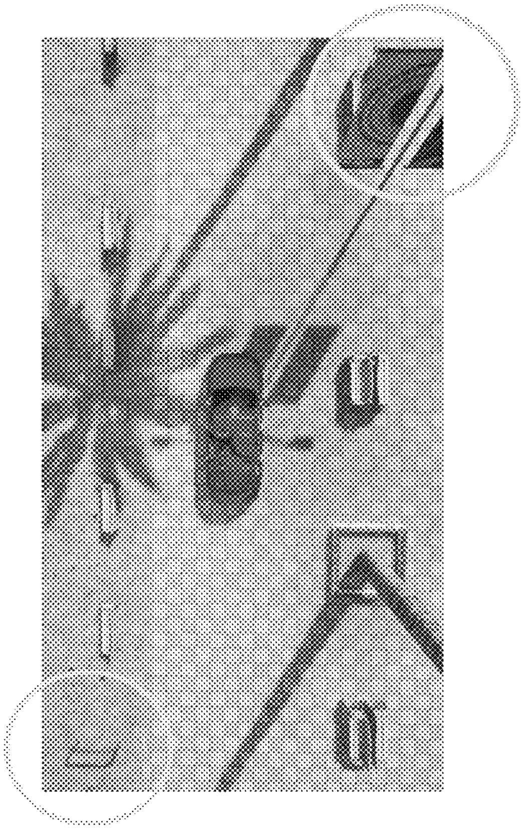
FIG. 12 is an example diagram of a surround view image provided by an embodiment of the present application.

For example, FIG. 12 is an example of a surround view image provided by an embodiment of the present application. After the surround view image is input into the obstacle recognition model, the obstacle recognition model predicts that an object in a circle in a lower left corner of the surround view image is the planar obstacle of the first category, and the obstacle recognition model predicts that an object in a circle in an upper right corner of the surround view image is the planar obstacle of the first category.

S502, the electronic device determines a misjudgment score of each predicted obstacle based on a comparison result between the predicted category of each predicted obstacle and an actual category of the virtual obstacle.

In one embodiment, the electronic device can determine a degree of possible danger based on the comparison result, thereby the electronic device determines the corresponding misjudgment score. The higher the degree of danger, the higher the corresponding misjudgment score, and the worse the performance of the surround view monitor.

In one embodiment, the electronic device can determine the comparison result between the predicted category and the actual category by searching a fourth relationship table, and determine the misjudgment score based on the comparison result, among them, the fourth relationship table includes the relationship between the comparison result between the predicted category and the actual category, and the misjudgment score, as shown in Table 4.

TABLE 4

| Predicted category | Actual category | Misjudgment score |
|---|---|---|
| The first category | The first category | 0 |
| Plane obstacles (no | The second category | 2 |
| need to avoid) | The third category | 5 |
| The second category | The first category | 0 |
| Inanimate three-dimensional | The second category | 0 |
| obstacles, or immovable | The third category | 3 |
| three-dimensional obstacles | | |
| (must be avoided) | | |
| The third category | The first category | 1 |
| Living three-dimensional | The second category | 0 |
| obstacles or moving obstacles | The third category | 0 |
| (must be avoided) | | |

In an example, as shown in FIG. 12, the predicted category of a metal railing in the lower left corner is the first category, but the actual category is the second category, so the misjudgment score is 2; the predicted category of the flagpole flag in the upper right corner is the first category, but the actual category is the second category, then the misjudgment score is 2.

In an example, the reason for setting the misjudgment score in table 4 is explained as follows:

When the predicted category is consistent with the actual category, it means that the driver will not misjudge the obstacle based on the surround view image, and the misjudgment score is the lowest;

When the predicted category is the first category and the actual category is the second category, the driver may drive and collide with an inanimate three-dimensional obstacle. This is more dangerous and the misjudgment score is higher;

When the predicted category is the first category and the actual category is the third category, the driver may drive and collide with a living three-dimensional obstacle. This is the most dangerous situation and the misjudgment score is the highest;

When the predicted category is the second category and the actual category is the first category, the driver may avoid the plane obstacle, and there is basically no danger, and the misjudgment score is the lowest;

When the predicted category is the second category and the actual category is the third category, the driver may collide with a living three-dimensional obstacle when the driver has to collide with the obstacle to make an emergency stop during emergency avoidance, causing some accidents, the misjudgment score will be higher;

When the predicted category is the third category and the actual category is the first category, the driver may judge that a drivable area has shrunk, and the driver may collide with other three-dimensional obstacles when urgently avoiding the obstacle of the third category, which may cause a certain danger, and the misjudgment score is low;

When the predicted category is the third category and the actual category is the second category, and the driver will avoid the obstacle of the third category, but actually avoid the three-dimensional obstacle of the second category, there is no danger, and the misjudgment score is the lowest.

S503, the electronic device determines a position weight of each predicted obstacle according to a position range to which a position of each predicted obstacle in the surround view image belongs.

Figure 13:
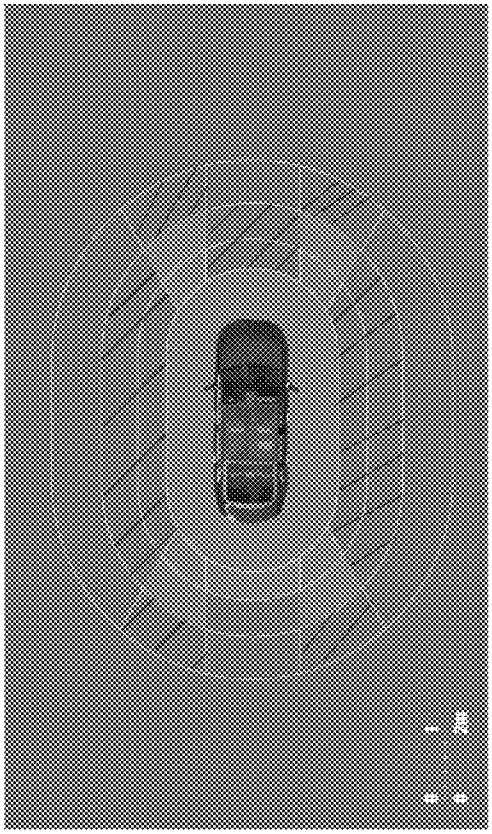
FIG. 13 is an example diagram of a plurality of areas of a surround view image provided by an embodiment of the present application.

In one embodiment, as shown in FIG. 13, the electronic device can divide the surround view image a plurality of areas according to a positional relationship with the virtual vehicle. The electronic device can set a corresponding position weight for each area. The greater the position weight, the higher the risk level of the predicted obstacle in the area. The plurality of areas includes a light gray area closest to the virtual vehicle, a shadow area adjacent to the light gray area, and a dark gray area outside the shadow area.

In one embodiment, the electronic device can determine a corresponding relationship between the area where the predicted obstacle is located in the surround view image and the position weight by searching a fifth relationship table, the fifth relationship table includes a corresponding relationship between the area in which the predicted obstacle is located and the position weight. Table 5 is shown as an example.

TABLE 5

| Area in which the predicted obstacle is located | Position weight |
|---|---|
| Light gray area | 5 |
| Shadow area | 2 |
| Dark gray area | 1 |

In an example, as shown in FIG. 12 and FIG. 13, the predicted obstacle in the lower left corner is in the dark gray area, and the corresponding position weight is 1; the predicted obstacle in the upper right corner is in the dark gray area, and the corresponding position weight is 1.

In an example, the reason for setting the position weight in table 5 is explained as follows: the closer the obstacle is to the vehicle, the shorter a countdown time of a collision between the vehicle and the obstacle, so the position weight of the obstacle closer to the vehicle is higher. the closer the obstacle is to a direction of four wheels of the vehicle, the greater a possibility that it is in the blind spot of the driver's visual range, and the higher a possibility of the vehicle colliding with the obstacle. Therefore, the closer the obstacle is to the direction of the four wheels of the vehicle, the higher the position weight.

S504, the electronic device determines a risk score of each predicted obstacle based on the misjudgment score and the position weight of each predicted obstacle.

In one embodiment, the risk score of each predicted obstacle may be determined based on a product of the misjudgment score of each predicted obstacle and the position weight. For example, as shown in FIG. 12, the predicted obstacle in the lower left corner has the misjudgment score of 2 and has the position weight of 1, so its risk score is 2×1=2; the predicted obstacle in the upper right corner has the misjudgment score of 2 and has the position weight of 1, then its risk score is 2×1=2.

S505, the electronic device determines a safety coefficient score of the surround view monitor based on the risk score of each of all predicted obstacles.

In one embodiment, the electronic device can determine a fourth numerical range to which a sum of the risk scores of all predicted obstacles in the surround view image belongs, and can determine the correspondence between the fourth numerical range and the safety coefficient score by searching a sixth relationship table relationship, thereby the electronic device can determine the safety coefficient score, the sixth relationship table includes the corresponding relationship between the fourth numerical range and the safety coefficient score, for example, as shown in table 6.

TABLE 6

| Fourth numerical range | Safety coefficient score |
|---|---|
| (0, 50] | 4 |
| (50, 100] | 3 |
| (100, 200] | 2 |
| >200 | 1 |

In an example, if there are two predicted obstacles in the surround view image, and one of the predicted obstacles has a risk score of 2, and the other predicted obstacle also has a risk score of 2, then the sum of the risk scores of all predicted obstacles in the surround view image=2+2=4, the fourth value range that the sum belongs to is (0, 50], and the corresponding safety coefficient score is 4.

In one embodiment, the electronic device may further determine a comprehensive score of the surround view monitor based on scores in the plurality of dimensions.

In one embodiment, the method for scoring the surround view monitor provided by the embodiment of the present application constructs the virtual environment system including at least one preset scene, and constructs the plurality of virtual camera devices corresponding to the surround view monitor in the virtual environment system, uses the plurality of virtual camera devices to sample the preset scene to obtain the plurality of simulated images; uses the surround view monitor to generate the surround view image corresponding to the plurality of simulated images, and scores the surround view monitor in the plurality of dimensions based on the surround view image. The surround view monitor can be simulated and scored in the virtual surround view monitor, thereby saving costs by using a virtual surround view monitor instead of a real environment layout. In addition, based on surround view images obtained by sampling a plurality of preset scenes, it is possible to objectively score the surround view monitor in the plurality of dimensions corresponding to a plurality of scoring indicators.

Figure 14:
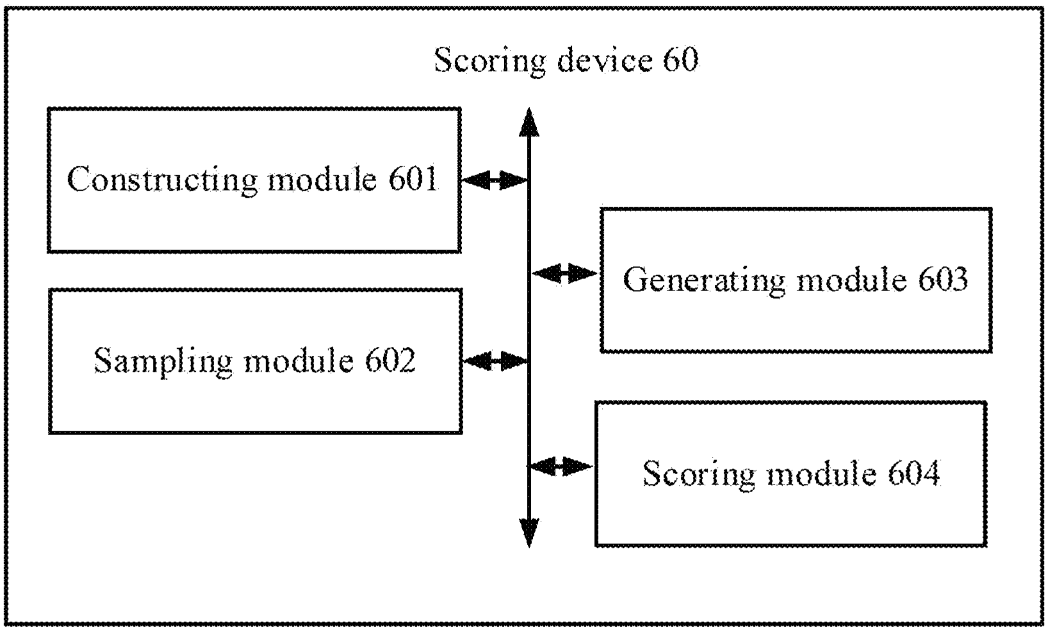
FIG. 14 is a structural diagram of a scoring device for a surround view monitor provided by an embodiment of the present application.

FIG. 14 is a structural diagram of a scoring device for a surround view monitor provided by an embodiment of the present application.

In some embodiments, a scoring device 60 of the surround view monitor may include a plurality of functional modules composed of computer program segments. The computer program of each program segment in the scoring device 60 can be stored in a storage device of the electronic device and executed by at least one processor to perform (see FIG. 2 for details) the function of the method of scoring the surround view monitor.

In this embodiment, the scoring device 60 can be divided into a plurality of functional modules according to the functions it performs. The functional modules may include a constructing module 601, a sampling module 602, a generating module 603, and a scoring module 604. The module referred to in the present application refers to a series of computer program segments that can be executed by at least one processor and can complete a fixed function, which are stored in the storage device. In this embodiment, regarding the functional implementation of each module in the scoring device 60, please refer to the above definition of the method of scoring the surround view monitor, and the description will not be repeated here.

The constructing module 601 is used to construct a virtual environment system, which includes at least one preset scene; and construct a plurality of virtual camera devices corresponding to a surround view monitor in the virtual environment system.

The sampling module 602 is configured to use the plurality of virtual camera devices to sample the preset scene to obtain a plurality of simulated images.

The generating module 603 is configured to use the surround view monitor to generate a surround view image corresponding to the plurality of simulated images.

The scoring module 604 is configured to score the surround view monitor in a plurality of dimensions based on the surround view image.

Embodiments of the present application also provide a computer-readable storage medium. A computer program is stored on the computer-readable storage medium. The computer program includes program instructions. When the program instructions are executed, the method described above can be implemented.

The computer-readable storage medium may be an internal storage device of the electronic device described in the above embodiment, such as a hard disk or a memory of the electronic device. The computer-readable storage medium may also be an external storage device of the electronic device, such as a plug-in hard disk, a smart memory card (SMC), or a secure digital (SD) card equipped on the electronic device, a Flash Card, etc.

In some embodiments, the computer-readable storage medium may include a storage program area and a storage data area, the storage program area may store an operating system, at least one application program required for a function, etc.; the storage data area may store data created according to a use of the electronic device, etc.

In the above embodiments, each embodiment is described with its own emphasis. For parts that are not detailed or documented in a certain embodiment, please refer to the relevant descriptions of other embodiments.

Those of ordinary skill in the art will appreciate that the units and algorithm blocks of each example described in conjunction with the embodiments disclosed herein can be implemented with an electronic hardware, or a combination of a computer software and an electronic hardware. Whether these functions are performed in hardware or software depends on the specific application and design constraints of the technical solution. Skilled artisans may implement the described functionality using different methods for each specific application, but such implementations should not be considered beyond the scope of the present application.

In the embodiments provided in the present application, it should be understood that the disclosed apparatus/terminal devices and methods can be implemented in other ways. For example, the embodiments of the apparatus/terminal device described above are only illustrative. For example, the division of modules or units is only a logical function division. In actual implementation, there may be other division methods, such as a plurality of units. Or components can be combined or can be integrated into another system, or some features can be omitted, or not implemented. On the other hand, the coupling or direct coupling or communication connection between each other shown or discussed may be through some interfaces, indirect coupling or communication connection of devices or units, which may be in electrical, mechanical or other forms.

The units described as separate components may or may not be physically separated, and the components shown as units may or may not be physical units, that is, they may be located in one place, or they may be distributed to a plurality of network units. Some or all of the units can be selected according to actual needs to achieve the purpose of the solution of this embodiment.

The above-described embodiments are only used to illustrate the technical solutions of the present application, but not to limit them; although the present application has been described in detail with reference to the foregoing embodiments, those of ordinary skill in the art should understand that they can still implement the above-mentioned implementations. The technical solutions described in the examples are modified, or some of the technical features are equivalently replaced; and these modifications or substitutions do not cause the essence of the corresponding technical solutions to deviate from the spirit and scope of the technical solutions in the embodiments of the present application should be included in the protection scope of the present application.

What is claimed is:

1. A method for scoring a surround view monitor, comprising:

constructing a virtual environment system, which comprises at least one preset scene;

constructing a plurality of virtual camera devices corresponding to the surround view monitor in the virtual environment system;

obtaining a plurality of simulated images by sampling the at least one preset scene using the plurality of virtual camera devices;

generating a surround view image corresponding to the plurality of simulated images using the surround view monitor; and scoring the surround view monitor in a plurality of dimensions based on the surround view image, comprising: scoring a visual range of the surround view monitor, and comprising:

determining an optimal visual range and a real visual range of the surround view monitor; and determining a visual range score of the surround view monitor based on a ratio between the real visual range and the optimal visual range.

2. The surround according to claim 1, wherein the at least one preset scene comprises a first scene and a second scene; the first scene comprises a preset number of plane images each of which has a preset pattern, and the second scene comprises a plurality of virtual obstacles that are three-dimensional.

3. The method according to claim 2, wherein when the preset scene is the first scene, scoring the surround view monitor in the plurality of dimensions based on the surround view image further comprises: scoring a degree of plane distortion of the surround view monitor, comprising:

determining an image area corresponding to each plane image in the surround view image according to the preset pattern;

determining a corner position error according to corner positions of each plane image and corner positions of the corresponding image area;

determining a number of image areas each of which having the corner position error, and determining a plane distortion proportion of the surround view monitor based on the determined number and a total number of plane images in the surround view image; and determining a score of the degree of plane distortion of the surround view monitor based on the corner position error corresponding to each of all the plane images and the plane distortion proportion.

4. The method according to claim 2, wherein when the preset scene is the second scene, scoring the surround view monitor in the plurality of dimensions based on the surround view image further comprises: scoring a safety coefficient of the surround view monitor, comprising:

performing an obstacle recognition on the surround view image using a preset obstacle recognition model and obtaining a predicted category of each predicted obstacle in the surround view image;

determining a misjudgment score of each predicted obstacle based on a comparison result between the predicted category of each predicted obstacle and an actual category of the virtual obstacle;

determining a position weight of each predicted obstacle according to a position range to which a position of each predicted obstacle in the surround view image belongs;

determining a risk score of each predicted obstacle based on the misjudgment score and the position weight of each predicted obstacle;

determining a safety coefficient score of the surround view monitor based on the risk score of each of all predicted obstacles.

5. The method according to claim 1, wherein the surround view monitor is applied to a vehicle, and the surround view monitor comprises a plurality of camera devices installed in the vehicle and a surround view model.

6. The method according to claim 5, wherein constructing the plurality of virtual camera devices corresponding to the surround view monitor in the virtual environment system comprises:

constructing a virtual vehicle corresponding to the vehicle in the virtual environment system according to a size of the vehicle; and acquiring system parameters of the surround view monitor, and constructing the plurality of virtual camera devices installed in the virtual vehicle in the virtual environment system based on the system parameters;

wherein the system parameters comprise camera parameters of each of the plurality of camera devices in the vehicle, and installation parameters of each camera device relative to the vehicle.

7. The method according to claim 1, wherein generating the surround view image corresponding to the plurality of simulated images using the surround view monitor comprises:

inputting the plurality of simulated images into the surround view monitor, and generating the surround view image corresponding to the plurality of simulated images using a surround view model in the surround view monitor.

8. The method according to claim 1, wherein the optimal visual range is determined based on a gyration radius of the vehicle to which the surround view monitor is applied and a size of the vehicle, and the real visual range of the surround view monitor is determined based on the surround view image.

9. An electronic device, comprising:

a storage device storing at least one instruction; and at least one processor, when the at least one instruction is executed by the at least one processor, the at least one processor is caused to:

construct a virtual environment system, which comprises at least one preset scene;

construct a plurality of virtual camera devices corresponding to the surround view monitor in the virtual environment system;

obtain a plurality of simulated images by sampling the at least one preset scene using the plurality of virtual camera devices;

generate a surround view image corresponding to the plurality of simulated images using the surround view monitor; and score the surround view monitor in a plurality of dimensions based on the surround view image, comprising: scoring a visual range of the surround view monitor, and comprising:

determining an optimal visual range and a real visual range of the surround view monitor; and determining a visual range score of the surround view monitor based on a ratio between the real visual range and the optimal visual range.

10. The electronic device according to claim 9, wherein the at least one preset scene comprises a first scene and a second scene; the first scene comprises a preset number of plane images each of which has a preset pattern, and the second scene comprises a plurality of virtual obstacles that are three-dimensional.

11. The electronic device according to claim 10, wherein when the preset scene is the first scene, the at least one processor scoring the surround view monitor in the plurality of dimensions based on the surround view image further comprises: scoring a degree of plane distortion of the surround view monitor, comprising:

determining an image area corresponding to each plane image in the surround view image according to the preset pattern;

determining a corner position error according to corner positions of each plane image and corner positions of the corresponding image area;

determining a number of image areas each of which having the corner position error, and determining a plane distortion proportion of the surround view monitor based on the determined number and a total number of plane images in the surround view image; and determining a score of the degree of plane distortion of the surround view monitor based on the corner position error corresponding to each of all the plane images and the plane distortion proportion.

12. The electronic device according to claim 10, wherein when the preset scene is the second scene, the at least one processor scoring the surround view monitor in the plurality of dimensions based on the surround view image further comprises: scoring a safety coefficient of the surround view monitor, comprising:

performing an obstacle recognition on the surround view image using a preset obstacle recognition model and obtaining a predicted category of each predicted obstacle in the surround view image;

determining a misjudgment score of each predicted obstacle based on a comparison result between the predicted category of each predicted obstacle and an actual category of the virtual obstacle;

determining a position weight of each predicted obstacle according to a position range to which a position of each predicted obstacle in the surround view image belongs;

determining a risk score of each predicted obstacle based on the misjudgment score and the position weight of each predicted obstacle;

determining a safety coefficient score of the surround view monitor based on the risk score of each of all predicted obstacles.

13. The electronic device according to claim 9, wherein the surround view monitor is applied to a vehicle, and the surround view monitor comprises a plurality of camera devices installed in the vehicle and a surround view model.

14. The electronic device according to claim 13, wherein the at least one processor constructs the plurality of virtual camera devices corresponding to the surround view monitor in the virtual environment system by:

constructing a virtual vehicle corresponding to the vehicle in the virtual environment system according to a size of the vehicle; and acquiring system parameters of the surround view monitor, and constructing the plurality of virtual camera devices installed in the virtual vehicle in the virtual environment system based on the system parameters;

wherein the system parameters comprise camera parameters of each of the plurality of camera devices in the vehicle, and installation parameters of each camera device relative to the vehicle.

15. The electronic device according to claim 9, wherein the at least one processor generates the surround view image corresponding to the plurality of simulated images using the surround view monitor by:

inputting the plurality of simulated images into the surround view monitor, and generating the surround view image corresponding to the plurality of simulated images using a surround view model in the surround view monitor.

16. The electronic device according to claim 9, wherein the at least one processor determines the optimal visual range based on a gyration radius of the vehicle to which the surround view monitor is applied and a size of the vehicle, and determines the real visual range of the surround view monitor based on the surround view image.

17. A non-transitory storage medium, being stored with instructions, which when executed by a processor, causing the processor performs a method of scoring a surround view monitor, wherein the method comprises:

constructing a virtual environment system, which comprises at least one preset scene;

constructing a plurality of virtual camera devices corresponding to the surround view monitor in the virtual environment system;

obtaining a plurality of simulated images by sampling the at least one preset scene using the plurality of virtual camera devices;

generating a surround view image corresponding to the plurality of simulated images using the surround view monitor; and scoring the surround view monitor in a plurality of dimensions based on the surround view image, comprising: scoring a visual range of the surround view monitor, and comprising:

determining an optimal visual range and a real visual range of the surround view monitor; and determining a visual range score of the surround view monitor based on a ratio between the real visual range and the optimal visual range.

18. The non-transitory storage medium according to claim 17, wherein the at least one preset scene comprises a first scene and a second scene; the first scene comprises a preset number of plane images each of which has a preset pattern, and the second scene comprises a plurality of virtual obstacles that are three-dimensional.

19. The non-transitory storage medium according to claim 18, wherein when the preset scene is the first scene, scoring the surround view monitor in the plurality of dimensions based on the surround view image further comprises: scoring a degree of plane distortion of the surround view monitor, comprising:

determining an image area corresponding to each plane image in the surround view image according to the preset pattern;

determining a corner position error according to corner positions of each plane image and corner positions of the corresponding image area;

determining a number of image areas each of which having the corner position error, and determining a plane distortion proportion of the surround view monitor based on the determined number and a total number of plane images in the surround view image; and determining a score of the degree of plane distortion of the surround view monitor based on the corner position error corresponding to each of all the plane images and the plane distortion proportion.

20. The non-transitory storage medium according to claim 17, wherein the optimal visual range is determined based on a gyration radius of the vehicle to which the surround view monitor is applied and a size of the vehicle, and the real visual range of the surround view monitor is determined based on the surround view image.

* * * * *